United States Patent
Nagase

(10) Patent No.: US 6,628,630 B1
(45) Date of Patent: Sep. 30, 2003

(54) SPREAD SPECTRUM COMMUNICATION METHOD

(75) Inventor: Taku Nagase, Tokyo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/058,881

(22) Filed: Apr. 13, 1998

(30) Foreign Application Priority Data

Apr. 15, 1997 (JP) .............................................. 9-111748

(51) Int. Cl.[7] .................................................. H04Q 7/00
(52) U.S. Cl. ........................................ 370/331; 455/436
(58) Field of Search ................................ 370/331, 335, 370/320, 342, 479, 334; 455/442, 437, 438, 439, 436

(56) References Cited

U.S. PATENT DOCUMENTS

| | | | | |
|---|---|---|---|---|
| 5,345,448 A | * | 9/1994 | Keskitalo | |
| 5,392,452 A | * | 2/1995 | Davis | 455/33.2 |
| 5,504,774 A | | 4/1996 | Takai et al. | |
| 5,555,445 A | * | 9/1996 | Booth | 455/53.2 |
| 5,652,748 A | * | 7/1997 | Jolma et al. | 370/320 |
| 5,734,648 A | * | 3/1998 | Adachi et al. | 370/342 |
| 5,794,149 A | * | 8/1998 | Hoo | 455/438 |
| 5,872,774 A | * | 2/1999 | Wheatley, III et al. | 370/335 |
| 5,901,145 A | * | 5/1999 | Sawyer | 370/332 |
| 5,926,470 A | * | 7/1999 | Tiedemann | 370/334 |
| 5,933,112 A | | 8/1999 | Hiramatsu et al. | |
| 5,943,362 A | * | 8/1999 | Saito | 375/200 |
| 5,956,641 A | * | 9/1999 | Bruckert et al. | 455/442 |
| 5,966,095 A | | 10/1999 | Hiramatsu et al. | |
| 5,987,013 A | * | 11/1999 | Kabasawa | 370/331 |
| 5,987,326 A | * | 11/1999 | Tiedemann, Jr. et al. | 455/442 |
| 6,035,197 A | * | 3/2000 | Haberman et al. | 455/439 |
| 6,073,021 A | * | 6/2000 | Kumar et al. | 455/442 |
| 6,075,989 A | * | 6/2000 | Moore et al. | 455/436 |
| 6,078,571 A | * | 6/2000 | Hall | 370/331 |
| 6,097,709 A | * | 8/2000 | Kuwabara | 370/331 |
| 6,111,864 A | * | 8/2000 | Kabasawa | 370/332 |
| 6,118,987 A | | 9/2000 | Hiramatsu et al. | |
| 6,138,033 A | | 10/2000 | Kitade et al. | |
| 6,147,645 A | | 11/2000 | Yukitomo et al. | |
| 6,148,216 A | | 11/2000 | Osaki | |

FOREIGN PATENT DOCUMENTS

| | | |
|---|---|---|
| EP | 0680160 | 11/1995 |
| JP | 6217371 | 8/1994 |
| KR | 95-22270 | 7/1995 |
| WO | 96/02117 | 1/1996 |
| WO | 97/08910 | 3/1997 |

* cited by examiner

*Primary Examiner*—Ken Vanderpuye
(74) *Attorney, Agent, or Firm*—Greenblum & Bernstein, P.L.C.

(57) ABSTRACT

The spread spectrum communication system based on the CDMA-FDD system in which two or more carrier frequencies can be selectively used in the present invention is equipped with the section that carries out handover between base stations with the same carrier frequency switched by a spreading code from a carrier frequency used in communication and the section that switches carrier frequencies within the handover base station after handover between base stations is completed. This allows the mobile station to carry out handover between base stations with different frequencies without the mobile station transmitting/receiving two or more carrier frequencies simultaneously.

11 Claims, 10 Drawing Sheets

SPREAD SPECTRUM COMMUNICATION METHOD

BACKGROUND OF THE INVENTION

1. Field of the Invention

The present invention relates to digital radio communications systems used for mobile communication systems such as car telephones and portable telephones, in particular spread spectrum communication systems based on the CDMA-FDD system that carry out handover between base stations with different carrier frequencies.

2. Description of the Related Art

Mobile communication systems such as car telephones and portable telephones use a cellular system for an effective use of carrier frequencies. In the cellular system, the service area is divided into numerous cells, and in each cell, communication is performed between one base station and a plurality of mobile stations. When a mobile station moves to another cell, it is necessary to switch the communication counterpart from the base station of the old cell to the base station of the new cell. This is called handover between base stations.

FIG. 1 is a processing sequence diagram for handover in a spread spectrum communication system (portable telephone system) based on the conventional CDMA-FDD (Code Divisional Multiple Access-Frequency Divisional Duplex) system. Symbols f1 and C0, etc. in FIG. 1 denote carrier frequency number 1 and spreading code number 0, etc. Since the intention here is to facilitate expansion of base stations, the spreading code timing and frame timing are asynchronous between base stations. Furthermore, continues transmit/receive operations are carried out by taking prevention of interference with hearing aids into account.

The mobile station first calls base station A using carrier frequency number 1 for the down-link, and carrier frequency number 2 for the up-link. Then, the mobile station carries out handover to base station B and enters into communication using carrier frequency number 3 for the down-link, and carrier frequency number 4 for the up-link. The operation during handover between base stations under this condition is explained below.

The mobile station acquires synchronization of a spreading code and frame for down-link synchronization channel (f1, c0) of base station A first. The mobile station then connects down-link communication channel (f1, c1) and up-link communication channel (f2, c2) in that order with base station A to enter into communication with base station A. While communicating with base station A, the mobile station acquires synchronization of a spreading code and frame for down-link synchronization channel of carrier frequency number 3 of base station B (f3, c3) at the same time. After acquiring synchronization with base station B, the mobile station measures the receive level of both base station A and base station B and measures the timing difference between base station A and base station B at the same time.

If the receive level of base station B is greater than the receive level of base station A which is currently communicating, the mobile station issues a handover request to base station A. At this time, it also reports the information of said timing difference to base station A. Base station A reports the handover request received from the mobile station and the timing difference information to base station B via a base station control system. Base station B starts preparations for receiving the mobile station and a down-link communication channel directed to the mobile station is transmitted using carrier frequency number 3.

While maintaining the connection with base station A, the mobile station connects the down-link (f3, c5) and the up-link (f4, c6) of channels for communication with base station B. After a communication channel with base station B is established, the mobile station breaks connection with base station A. That completes handover.

In a portable telephone system based on the conventional CDMA-FDD system, when a mobile station carries out handover to a base station with a carrier frequency different from that of the base station with which it is currently communicating, it must transmit/receive two channels with different carrier frequencies simultaneously. Therefore, the mobile station must be provided with 2 lines of transmit/receive circuits, which entails the problem of increasing both the hardware size of the mobile station and power consumption.

SUMMARY OF THE INVENTION

The object of the present invention is to provide a spread spectrum communication system in which a mobile station need not transmit/receive two or more carrier frequencies simultaneously when carrying out handover to a base station with a different frequency.

This object is achieved a spread spectrum communication system in based on the CDMA-FDD system using a plurality of carrier frequencies selectively in which the spreading code timing and frame timing are asynchronous between base stations, including means for carrying out handover to the base station with the same carrier frequency while carrying out handover to a base station with a different carrier frequency and means for switching carrier frequencies within the handover base station after handover between these base stations. When carrying out handover to a base station with a different carrier frequency, this configuration eliminates the necessity of the mobile station transmitting/receiving channels with two or more carrier frequencies simultaneously, allowing the hardware size of the mobile station to be reduced.

DETAILED DESCRIPTION OF THE PREFERRED EMBODIMENTS

The first mode of the present invention in a spread spectrum communication system based on the CDMA-FDD system that allows a plurality of carrier frequencies to be selectively used, is equipped with the section that carries out handover between base stations with the same carrier frequency switched by a spreading code from a carrier frequency used for communication in progress, and the section that switches carrier frequencies within the handover ba on after handover between those base stations is completed. This allows the mobile station to carry out handover between base stations with different frequencies without the mobile station transmitting/receiving two or more carrier frequencies simultaneously.

The second mode of the present invention in the spread spectrum communication system based on the CDMA-FDD system that allows a plurality of carrier frequencies to be selectively used, is equipped with the section that switches from a normal communication carrier frequency to a specific carrier frequency for handover between base stations, the section that carries out handover between base stations with the same carrier frequency switched by a spreading code from said specific carrier frequency, and the section that switches from said specific carrier frequency to a normal communication carrier frequency within the handover base station after handover between these base stations is completed. This allows the mobile station to carry out handover between base stations with different frequencies without the mobile station transmitting/receiving two or more carrier frequencies simultaneously. Furthermore, since handover is carried out at a specific carrier frequency by securing a space in the communication line with several carrier frequencies, handover is easily achieved.

The third mode of the present invention in a portable telephone system based on the CDMA-FDD system, switches the carrier frequency within the handover base station when carrying out handover between cells with different carrier frequencies, and then carries out handover between base stations at the same carrier frequency. This allows the mobile station to flexibly realize handover between base stations with different carrier frequencies without the mobile station transmitting/receiving two or more carrier frequencies simultaneously.

With reference now to the attached drawings, the embodiments of the present invention are explained in detail below:

Embodiment 1

The Embodiment 1 of the present invention describes a spread spectrum communication system equipped with the section that carries out handover between base stations at the same carrier frequency and the section that switches carrier frequencies within the handover base station.

Figure 1:
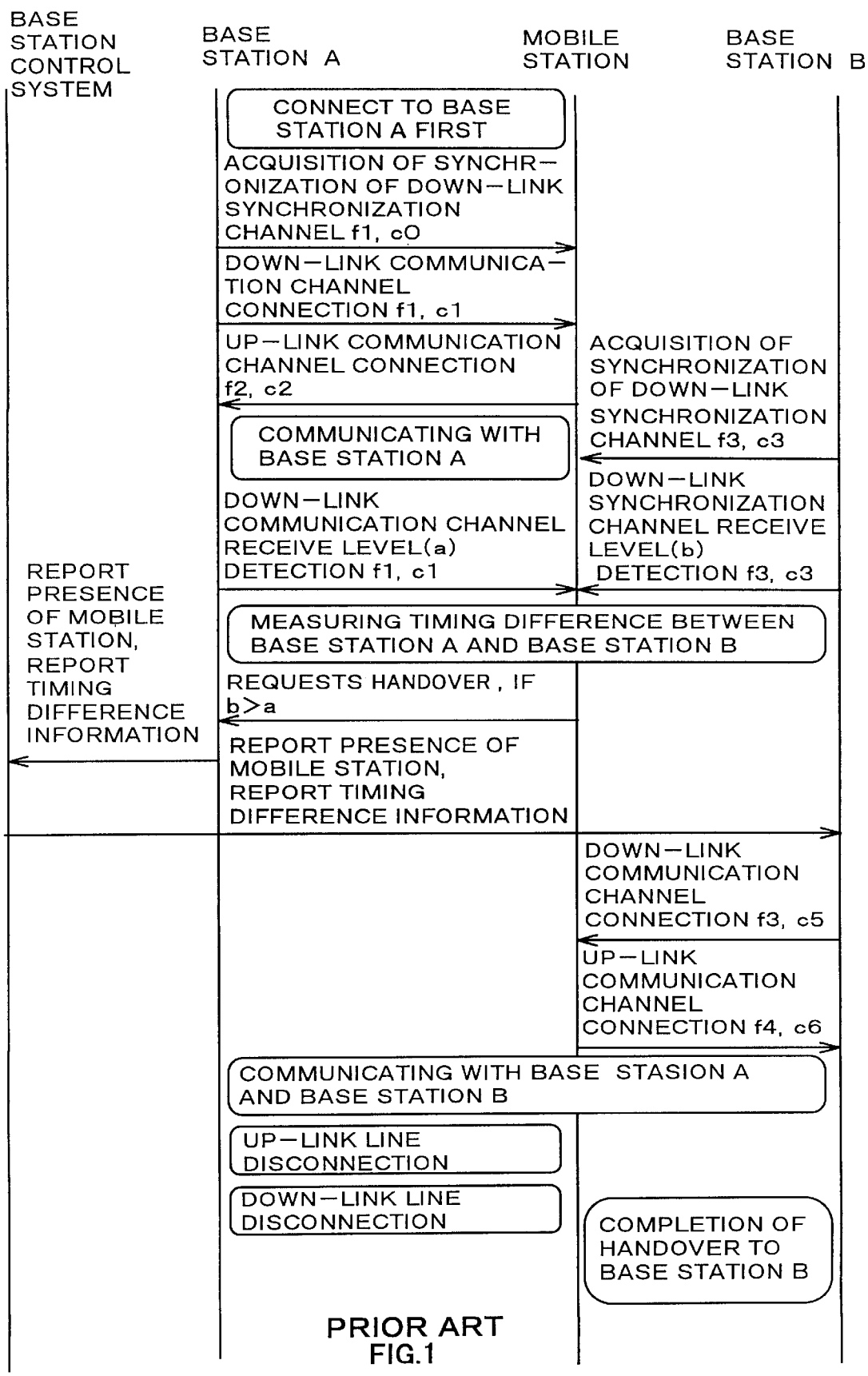
FIG. 1 is a sequence diagram of handover between base stations based on the conventional spread spectrum communication system.
Figure 2:
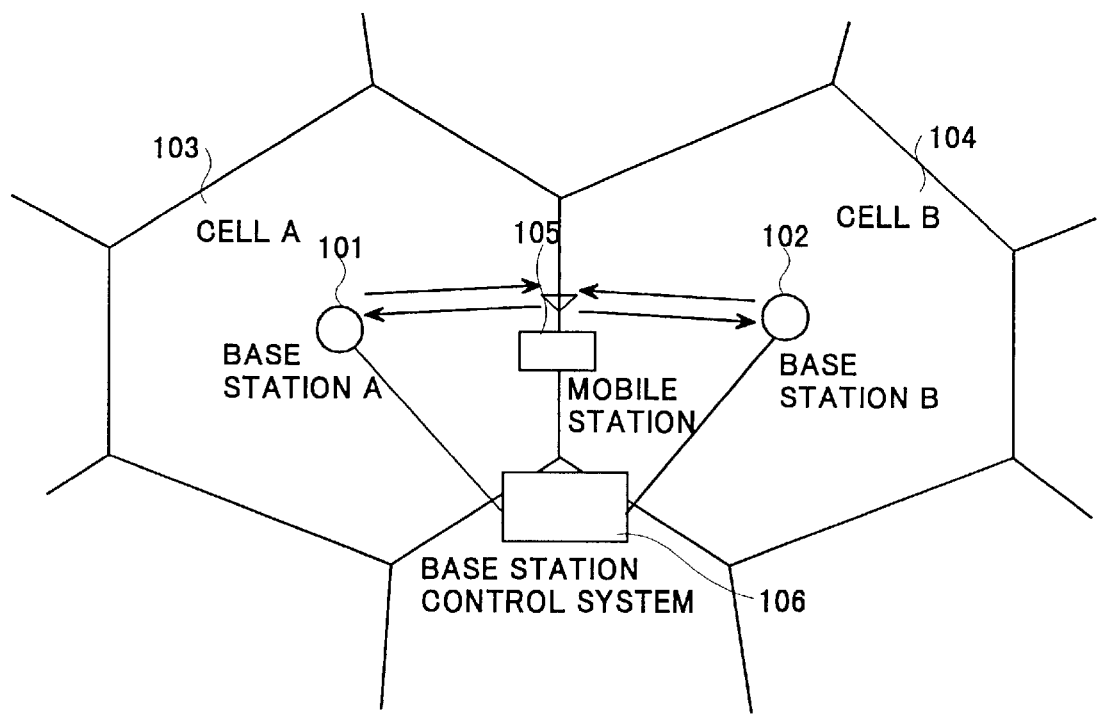
FIG. 2 is a drawing to explain handover between base stations.

FIG. 2 is a drawing to explain handover between base stations in a spread spectrum communication system based on the CDMA-FDD system (portable telephone system). In FIG. 2, mobile station 105 is communicating with base station A 101 in cell A 103 and move to cell B 104 to carry out handover to base station B 102. Base station A 101 and base station B 102 are controlled by base station control system 106.

Figure 3:
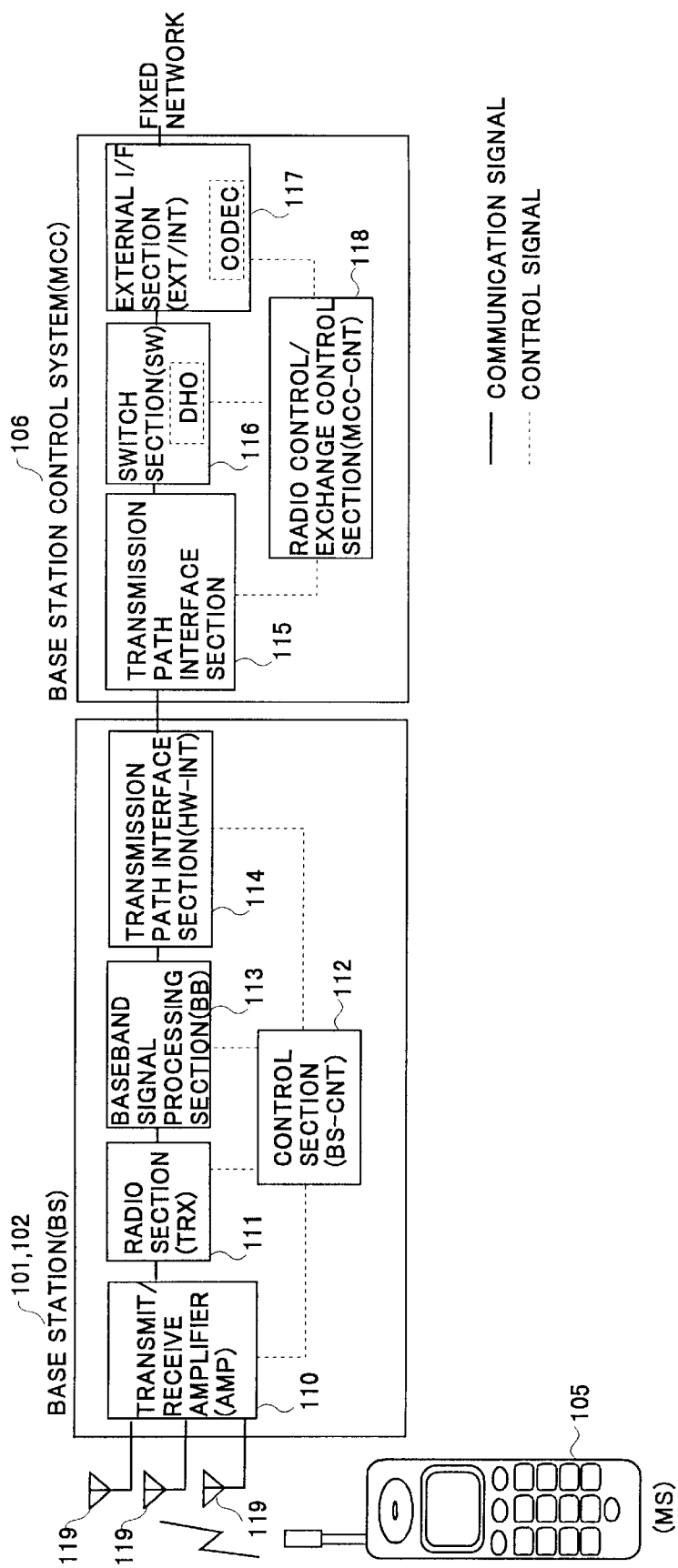
FIG. 3 is a block diagram showing a configuration of the spread spectrum communication system of the present invention.

To be concrete, as shown in FIG. 3, base stations (BS) 101 and 102 are equipped with transmit/receive amplification section (AMP) 110, radio section (TRX) 111 that extracts a baseband signal from the carrier, baseband signal processing section (BB) 113 that obtains data from the baseband signal, transmission path interface section (HW-INT) 114, and control section (BS-CNT) 112 that controls the entire system.

Base station control system (MCC) 106 that controls base stations BS 101 and 102 is equipped with transmission path interface section 115, switch section (SW) 116 that carries out handover between base stations, external I/F section (EXT/INT) 117, and radio control/exchange control section (MCC-CNT) 118.

Figure 4:
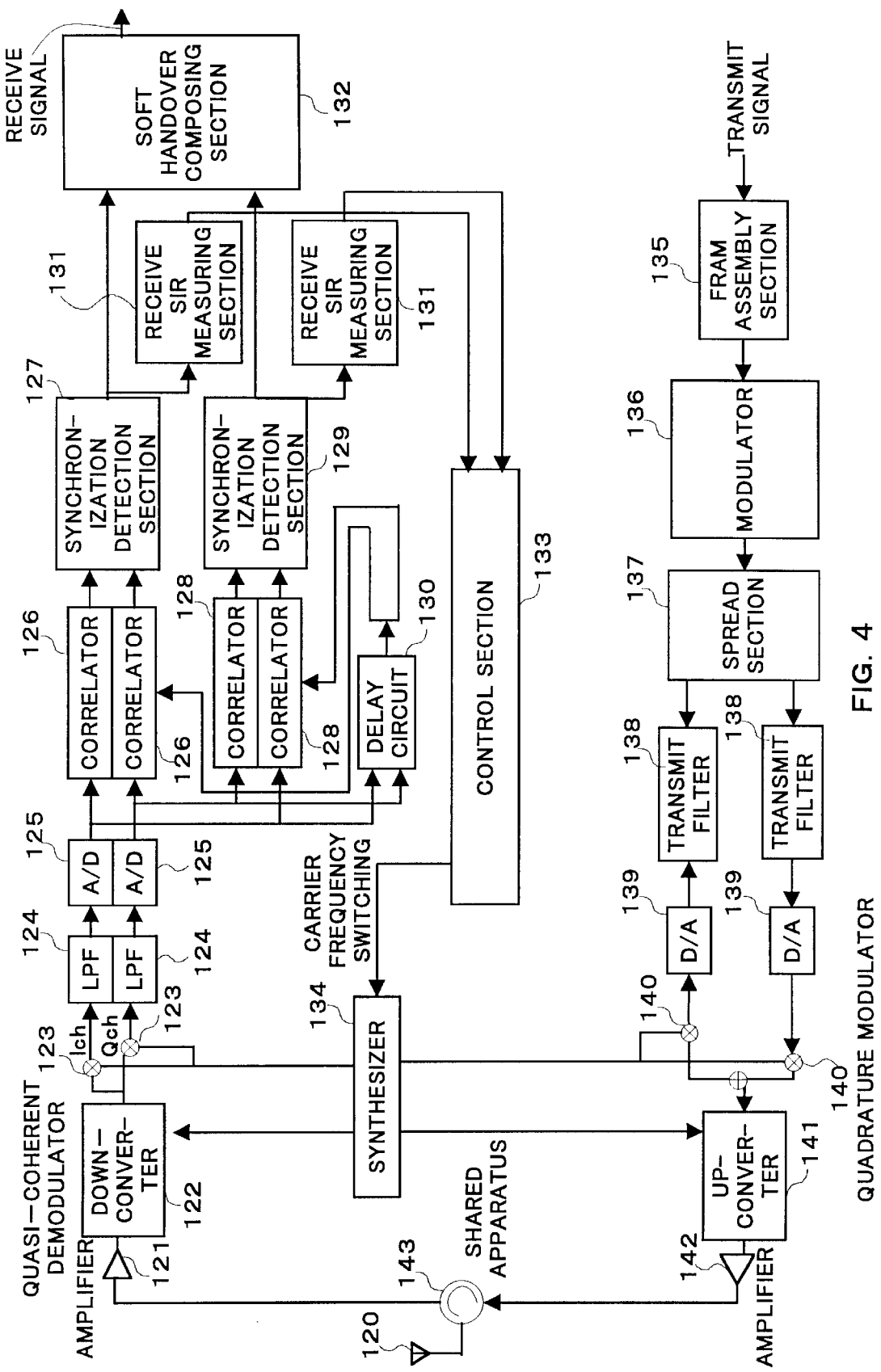
FIG. 4 is a block diagram showing the configuration of a mobile station in the spread spectrum communication system of the present invention.

FIG. 4 is a block diagram showing the configuration of mobile station 105 that communicates with base stations 101 and 102. When this mobile station 105 receives a signal from antenna 120, it amplifies the signal with amplifier 121 and sends it to down-converter 122. After the carrier is eliminated by down-converter 122, the receive signal is divided into channel I and channel Q, and detected each by quasi-coherent demodulation section 123. Then, their respective channel signals are passed through LPF (Low Pass Filter) and converted from analog to digital by A/D converter 125.

The signal converted from analog to digital is divided into two systems and their correlative values are obtained by correlators 126 and 128, and synchronization is detected by synchronization detectors 127 and 129. The A/D-converted signal is sent to correlators 126 and 128 via delay section 130. These signals are further sent to receive SIR measuring section 131 that calculates their receive SIR which is the receive quality and also sent to soft handover composing section 132.

The receive SIR measurement result is sent to control section 133 and control section 133 instructs synthesizer 134 to switch the carrier frequency according to the measurement result. Synthesizer 134 sends the switched carrier frequency to down-converter 122, quasi-coherent demodulation section 123, and quadrature modulation section 140 and up-converter 141 which will be described later.

On the other hand, the transmit signal is frame-assembled by frame assembly section 135, modulated by modulator 136 and then spread through a spreading code by spread section 137. Then, the spread signal is passed through transmit filter 138, D/A-converted by D/A converter 139 and quadrature-modulated by quadrature modulation section 140. This quadrature-modulated transmit signal is carried by up-converter 141 onto a carrier, amplified by amplifier 142 and then transmitted from antenna 120.

Figure 5:
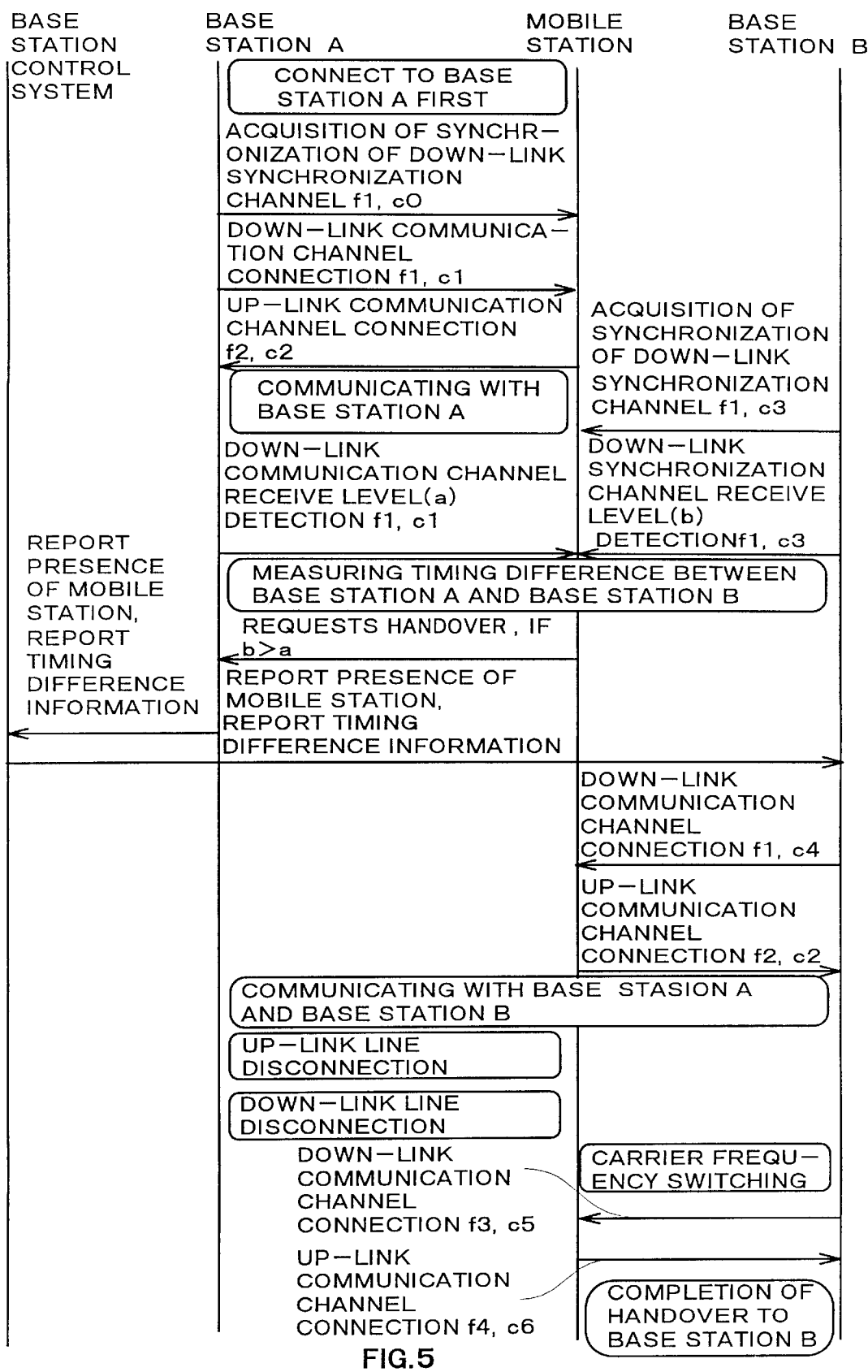
FIG. 5 is a sequence diagram in Embodiment 1 of the spread spectrum communication system of the present invention.
Figure 6:
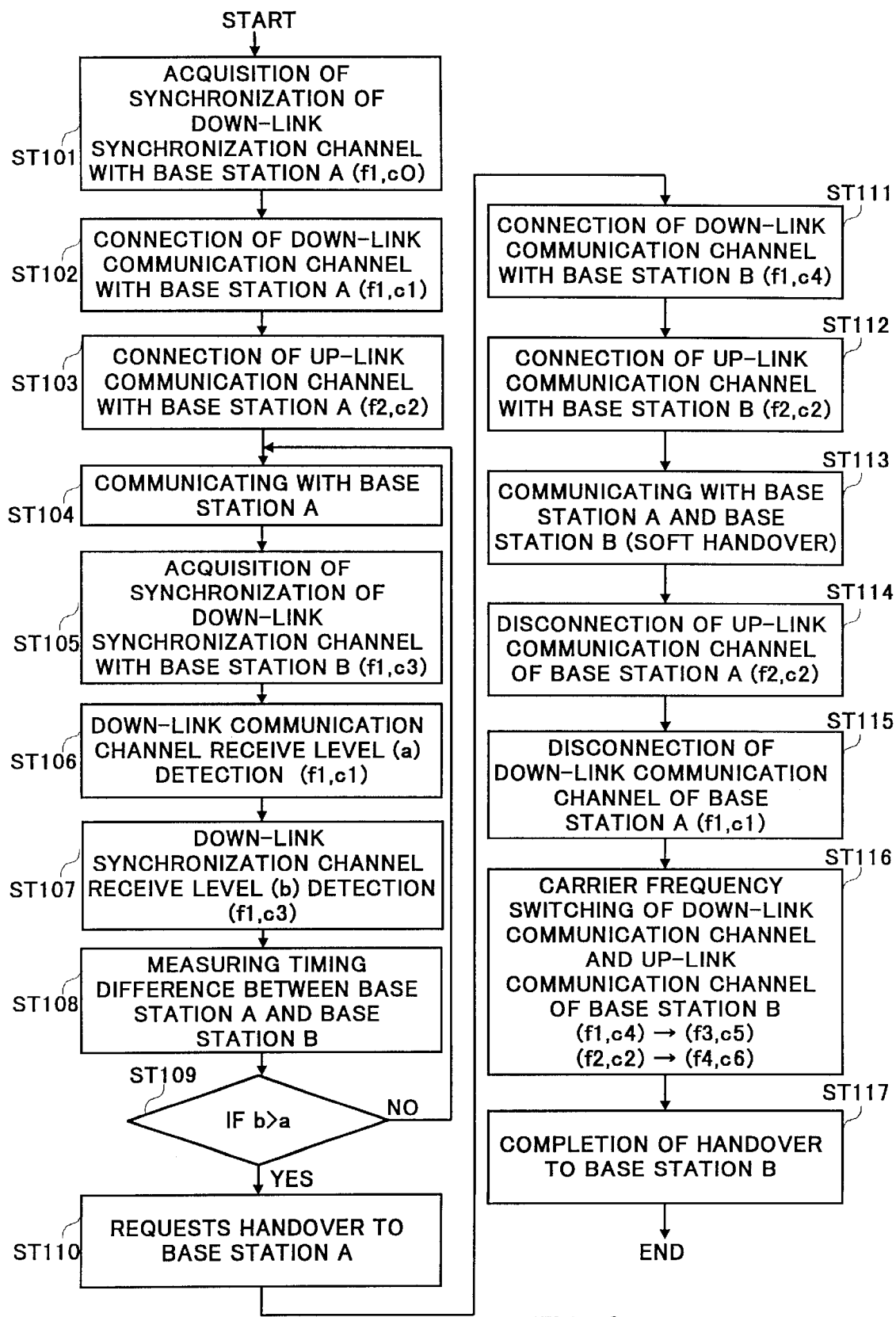
FIG. 6 is a flowchart of a mobile station in Embodiment 1 of the spread spectrum communication system of the present invention.

FIG. 5 is a processing sequence diagram in the case of handover of the spread spectrum communication system (portable telephone system) based on the CDMA-FDD system in Embodiment 1 of the present invention. FIG. 6 is a flowchart of the operation of the mobile station in said spread spectrum communication system. Symbols f1 and c0, etc. in FIG. 5 indicate carrier frequency number 1 and spreading code number 0, etc. Since the intention here is to expand base stations, the spreading code timing and frame timing are asynchronous between base stations. Furthermore, continuous transmit/receive operations are carried out by taking prevention of interference with hearing aids into account.

The mobile station communicates with base station A by carrier frequency number 1 for the down-link, and by carrier frequency number 2 for the up-link first. Then, the mobile station carries out handover to base station B and communicates by carrier frequency number 3 for the down-link and by carrier frequency number 4 for the up-link.

The mobile station acquires synchronization of a spreading code and frame for the down-link synchronization channel (f1, c0) of base station A first (ST 101). Then, the mobile station connects with base station A by down-link communication channel (f1, c1) and up-link communication channel (f2, c2) in that order, entering into communication with base station A (ST 102, 103). The mobile station acquires synchronization of a spreading code and frame (ST 105) for the down-link synchronization channel (f1, c3) of base station B while communicating with base station A (ST 104). Here, the down-link synchronization channel has been transmitted with all carrier frequency numbers, and therefore the mobile station needs only to acquire synchronization for the down-link synchronization channel with the same carrier frequency number as that of the currently communicating channel. It need not receive channels with two carrier frequencies simultaneously.

After the mobile station acquires synchronization with base station B, it measures the receive level of both base station A and base station B (ST 106, 107) and at the same time measures the timing difference between base station A and base station B (ST 108). If receive level b of base station B is greater than receive level a of base station A currently in communication (ST 109), the mobile station issues a handover request to base station A and at this time it also reports the information of said timing difference to base station A (ST 110). If receive level b of base station B is smaller than receive level a of base station A, the mobile station continues communication with base station A.

Base station A reports the handover request and timing difference information received from the mobile station to base station B via the base station control system. Base station B starts preparations for receiving the mobile station and sends the down-link communication channel (f1, c4) to the mobile station. The mobile station connects the down-link line (f1, c4) with the up-link line (f2, c2) of the communication channel with base station B while maintaining connection with base station A (ST 111, 112).

At this time, base station B uses said timing difference information to adjust the timing of receiving the down-link communication channel from base station B at the mobile station to match the timing of receiving the down-link communication channel from base station A at the mobile station. At this time, a timing error remains because of a difference between the distance between the mobile station and base station A and the distance between the mobile station and base station B. Therefore, the mobile station needs to search the receive timing within the range of said timing error to acquire correct receive timing of the down-link communication channel (f1, c4) from base station B.

Furthermore, base station B uses said timing difference information to acquire the receive timing of the up-link communication channel (f2, c2) transmitted from the mobile station. Since a timing error also remains because of a difference between the distance between the mobile station and base station A and the distance between the mobile station and base station B, base station B needs to search the up-link receive timing within the range of said timing error to acquire the correct receive timing of the up-link communication channel (f2, c2) from the mobile station.

The down-link communication channel (f1, c4) transmitted from base station B to the mobile station has the same carrier frequency number as that of the down-link communication channel (f1, c1) transmitted from base station A to the mobile station with the only difference of the spreading code number. Therefore, the mobile station need not receive channels with two carrier frequencies simultaneously even when the mobile station connects communication channels to both base station A and base station B simultaneously. Furthermore, the up-link communication channel (f2, c2) has the same carrier frequency numbers, spreading code numbers, spreading code timings, frame timings, and transmit information for base station A and base station B.

After a communication channel for base station B is established (ST 113), the connection with base station A is disconnected (ST 114, ST 115). Then at the time of connection with base station B, the up-link and down-link carrier frequencies are switched simultaneously to number 4 and number 3, respectively (ST 116). At this time, the spreading code timing and frame timing remain unchanged, and therefore the mobile station and base station can switch carrier frequencies simultaneously. The time in which the communication channel is instantaneously disconnected due to a change of the carrier frequency number is determined by the performance of the frequency synthesizer and can be suppressed to within several microseconds. At this time, the spreading code number is also changed if necessary. That completes handover to base station B (ST 117).

As described above, in accordance with the spread spectrum communication system in Embodiment 1, the mobile station can carry out handover between base stations with different carrier frequencies with a short instantaneous disconnection period without the mobile station having the function of transmitting/receiving channels with two carrier frequencies simultaneously.

Embodiment 2

The Embodiment 2 of the present invention describes a spread spectrum communication system equipped with the section that switches from a normal communication carrier frequency to a specific carrier frequency for handover between base stations, the section that carries out handover between base stations with the same carrier frequency which is switched by a spreading code from a specific carrier frequency, and the section that switches from said specific carrier frequency to a normal communication carrier frequency within the handover base station.

Figure 7:
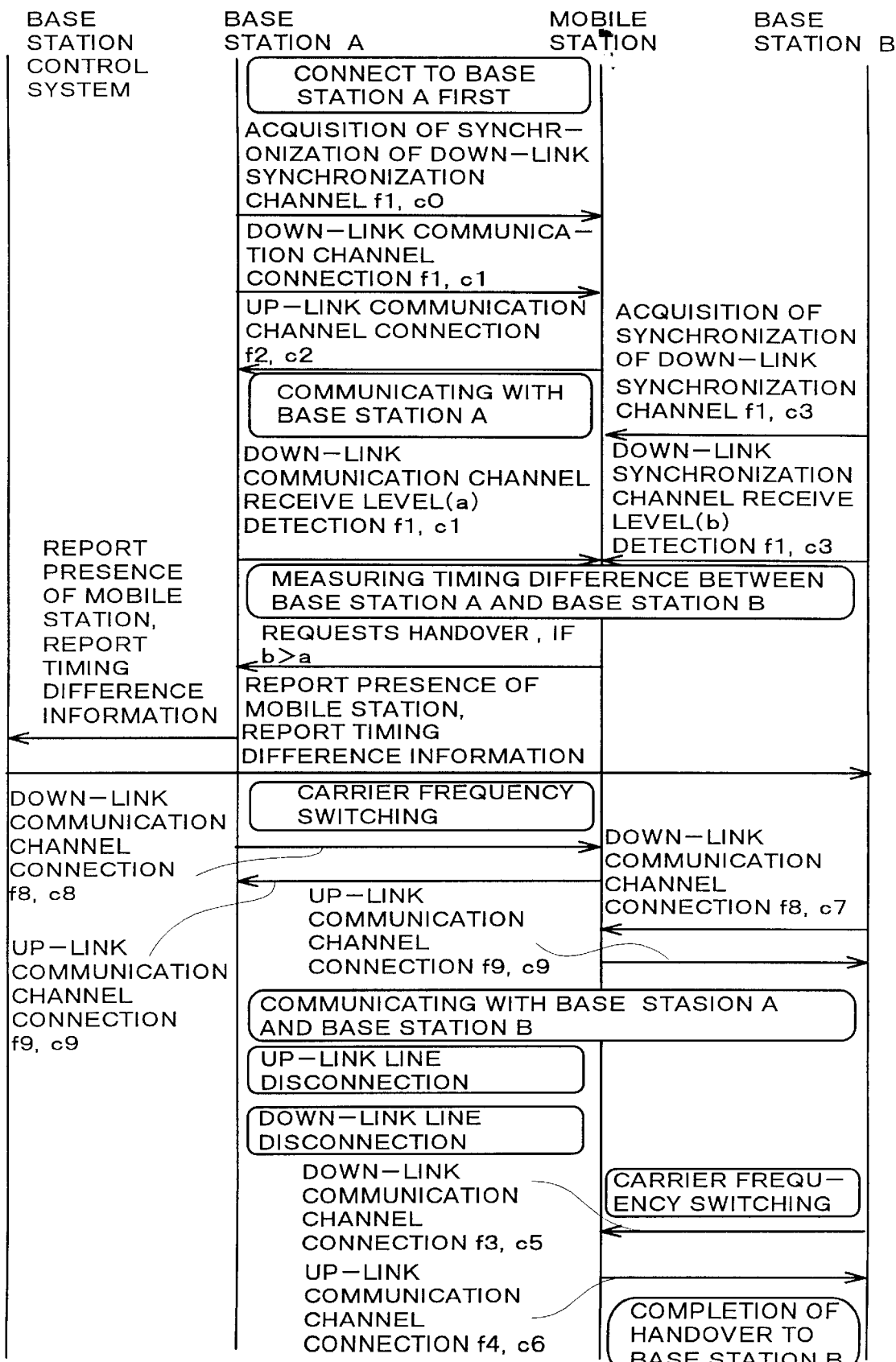
FIG. 7 is a sequence diagram in Embodiment 2 of the spread spectrum communication system of the present invention.
Figure 8:
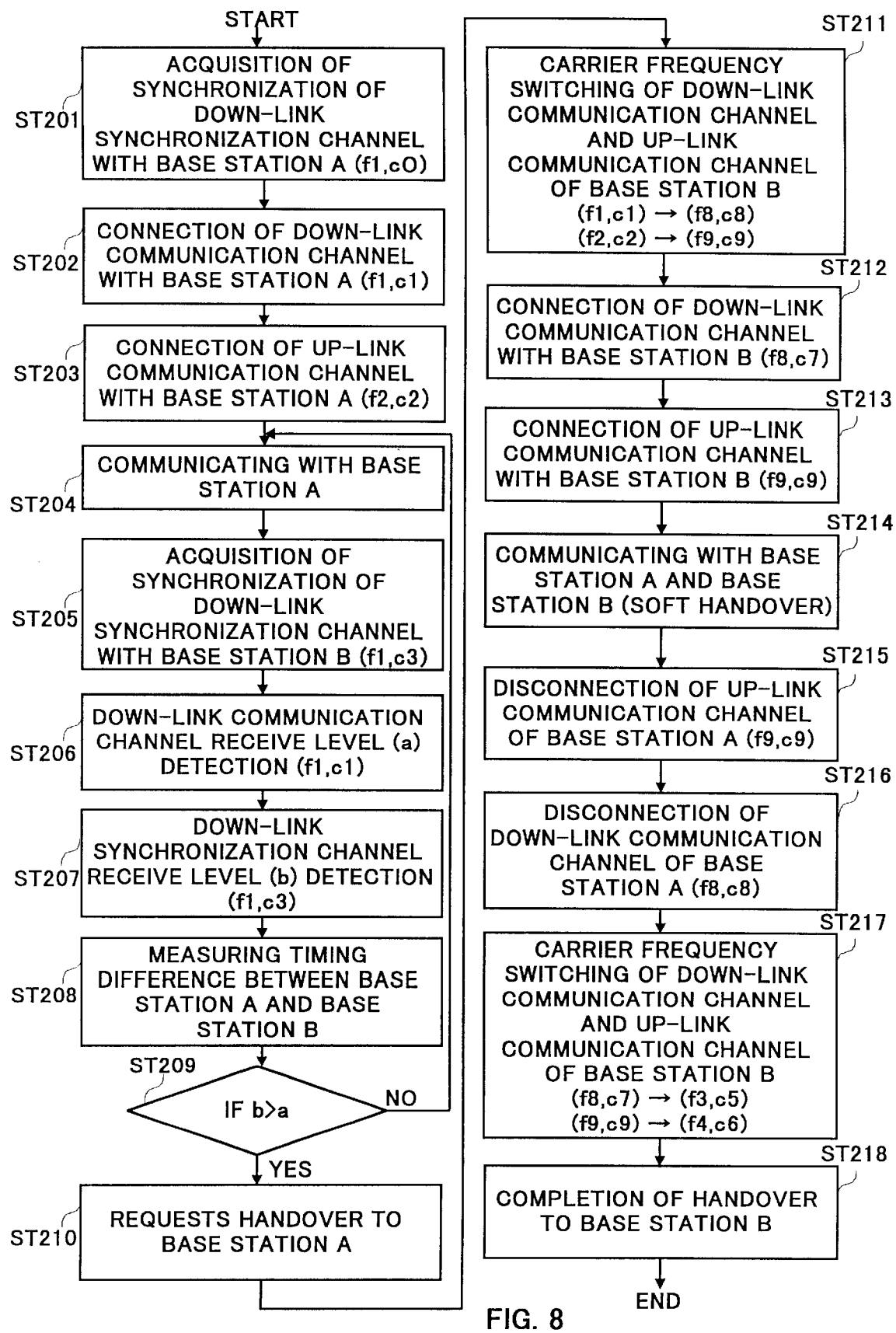
FIG. 8 is a flowchart of a mobile station in Embodiment 2 of the spread spectrum communication system of the present invention.

The spread spectrum communication system in Embodiment 2 (portable telephone system) has the same configuration as that of Embodiment 1, and therefore the explanation is omitted here. FIG. 7 is a processing sequence diagram of the spread spectrum communication system (portable telephone system) based on the CDMA-FDD system in Embodiment 2 of the present invention in the case of handover. FIG. 8 is a flowchart of the operation of a mobile station in said spread spectrum communication system. Symbols such as f1 and c0 in FIG. 7 indicate carrier frequency number 1 and spreading code number 0, etc. Since the intention here is to facilitate expansions of base stations, the spreading code timing and frame timing are asynchronous between base stations. Furthermore, continues transmit/receive operations are carried out by taking prevention of interference with hearing aids into account.

The mobile station communicates with base station A using carrier frequency number 1 for the down-link and carrier frequency number 2 for the up-link first. Then, the mobile station carries out handover to base station B and then enters into communication using carrier frequency number 3 for the down-link and carrier frequency number 4 for the up-link.

The mobile station acquires synchronization of a spreading code and frame for down-link synchronization channel (f1, c0) of base station A first (ST 201). The mobile station then connects down-link communication channel (f1, c1) and up-link communication channel (f2, c2) in that order with base station A to enter into communication with base station A (ST 202, 203). While communicating with base station A (ST 204), the mobile station acquires synchronization of a spreading code and frame (ST 205) for down-link synchronization channel (f1, c3) of base station B at the same time. Here, the down-link synchronization channel has been transmitted with all carrier frequency numbers, and therefore the mobile station needs only to acquire synchronization for the down-link synchronization channel with the same carrier frequency number as that of the currently communicating channel. It need not receive channels with two carrier frequencies simultaneously.

After the mobile station acquires synchronization with base station B, it measures the receive level of both base station A and base station B (ST 206, 207) and at the same time measures the timing difference between base station A and base station B (ST 208). If receive level b of base station B is greater than receive level a of base station A currently in communication (ST 209), the mobile station issues a handover request to base station A and at this time it also reports the information of said timing difference to base station A (ST 210). If receive level b of base station B is smaller than receive level a of base station A, the mobile station continues communication with base station A.

Base station A reports the handover request and timing difference information received from the mobile station to base station B via the base station control system. Base station B starts preparations for receiving the mobile station.

Then, at the time of connection with base station A, the up-link and down-link carrier frequencies are simultaneously switched to number 9 and number 8, respectively (ST 211). Here, number 9 on the up-link line and number 8 on the down-link line should be the numbers corresponding to the specific carrier frequencies used only for handover. At this time, since the spreading code timing and frame timing are unchanged, the carrier frequencies can be changed at the mobile station and base station simultaneously. The time in which the communication channel is instantaneously disconnected due to a change of the carrier frequency number is determined by the performance of the frequency synthesizer and can be suppressed to within several microseconds. At this time, the spreading code number is also changed if necessary.

After switchover of the up-link and down-link carrier frequencies at the time of connection with base station A is completed, a down-link communication channel (f8, c7) is transmitted from base station B to the mobile station. The up-link and down-link carrier frequency numbers used are number 9 and number 8 respectively. However, the spreading code number of the down-link communication channel should be set to a number different from that sent from base station A. While maintaining the connection with base station A, the mobile station connects the down-link (f8, c7) and the up-link (f9, c9) of channels for communication with base station B (ST 212, 213).

At this time, base station B uses said timing difference information to adjust the timing of receiving the down-link communication channel from base station B at the mobile station to match the timing of receiving the down-link communication channel from base station A at the mobile station. At this time, a timing error remains because of a difference between the distance between the mobile station and base station A and the distance between the mobile station and base station B. Therefore, the mobile station needs to search the receive timing within the range of said timing error to acquire correct receive timing of the down-link communication channel (f8, c7) from base station B.

Base station B uses said timing difference information to acquire the receive timing of the up-link communication channel (f9, c9) transmitted from the mobile station. Since a timing error also remains because of a difference between the distance between the mobile station and base station A and the distance between the mobile station and base station B at this time, base station B needs to search the up-link receive timing within the range of said timing error to acquire the correct receive timing of the up-link communication channel from the mobile station.

The down-link communication channel (f8, c7) transmitted from base station B to the mobile station has the same carrier frequency number as that of the down-link communication channel (f8, c8) transmitted from base station A to the mobile station with the only difference of the spreading code number. Therefore, the mobile station need not receive channels of two carrier frequencies simultaneously even when the mobile station connects communication channels to both base station A and base station B simultaneously. Furthermore, the up-link communication channel (f9, c9) has the same carrier frequency numbers, spreading code numbers, spreading code timings, frame timings, and transmit information for base station A and base station B.

After a communication channel for base station B is established (ST 214), the connection with base station A is disconnected (ST 215, ST 216). Then at the time of connection with base station B, the up-link and down-link carrier frequencies are switched simultaneously to number 4 and number 3, respectively (ST 217). At this time, the spreading code timing and frame timing remain unchanged, and therefore the mobile station and base station can switch carrier frequencies simultaneously. The time in which the communication channel is instantaneously disconnected due to a change of the carrier frequency number is determined by the performance of the frequency synthesizer and can be suppressed to within several microseconds. At this time, the spreading code number is also changed. That completes handover to base station B (ST 218).

As described above, in accordance with the spread spectrum communication system in Embodiment 2, the provision of the section that carries out handover between base stations at a specific carrier frequency can reduce carrier frequencies for handover between base stations, achieving a spread spectrum communication system based on the CDMA-FDD system with high line utilization at base stations.

Embodiment 3

Figure 9:
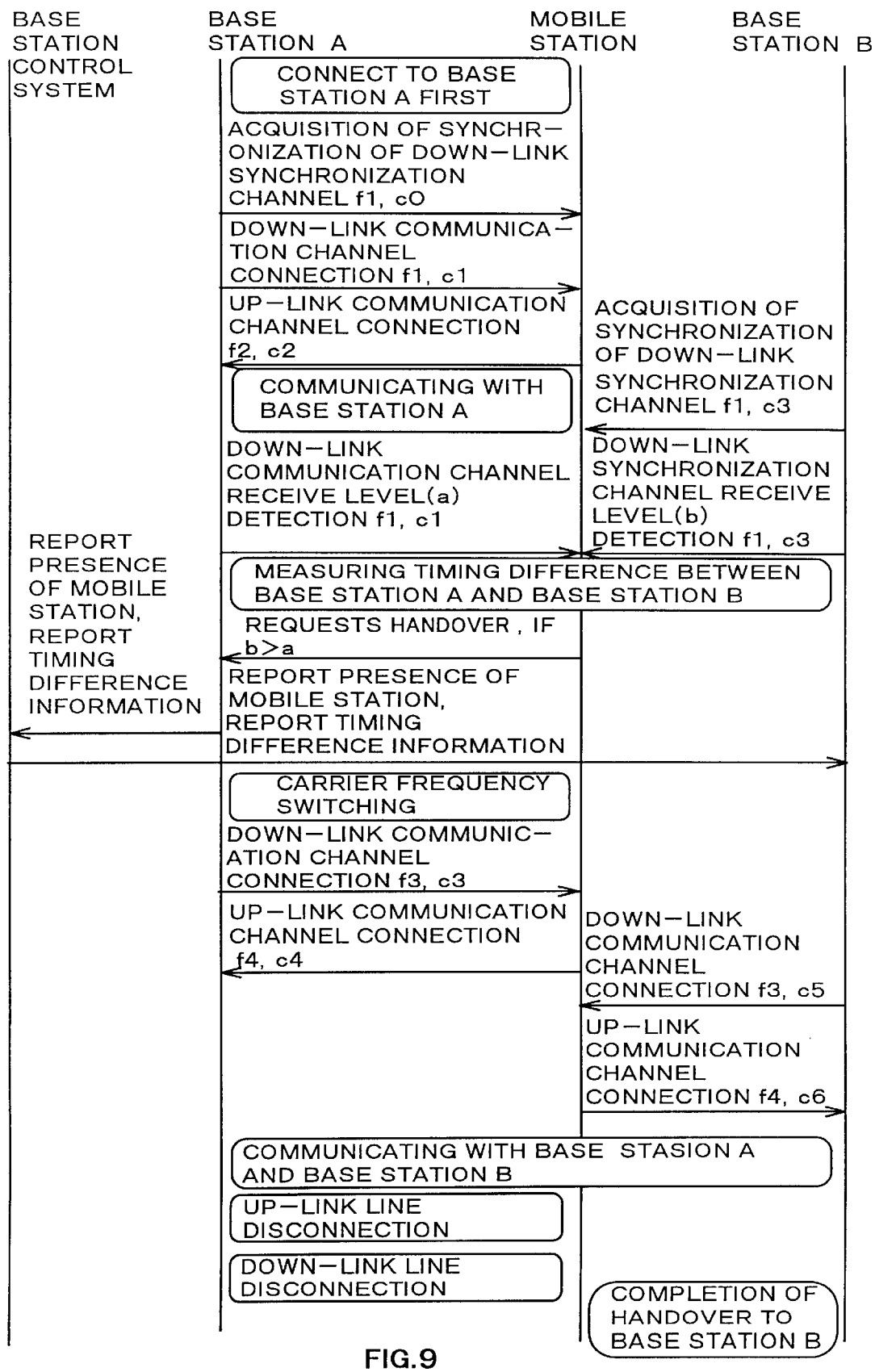
FIG. 9 is a sequence diagram of a mobile station in Embodiment 3 of the spread spectrum communication system of the present invention.
Figure 10:
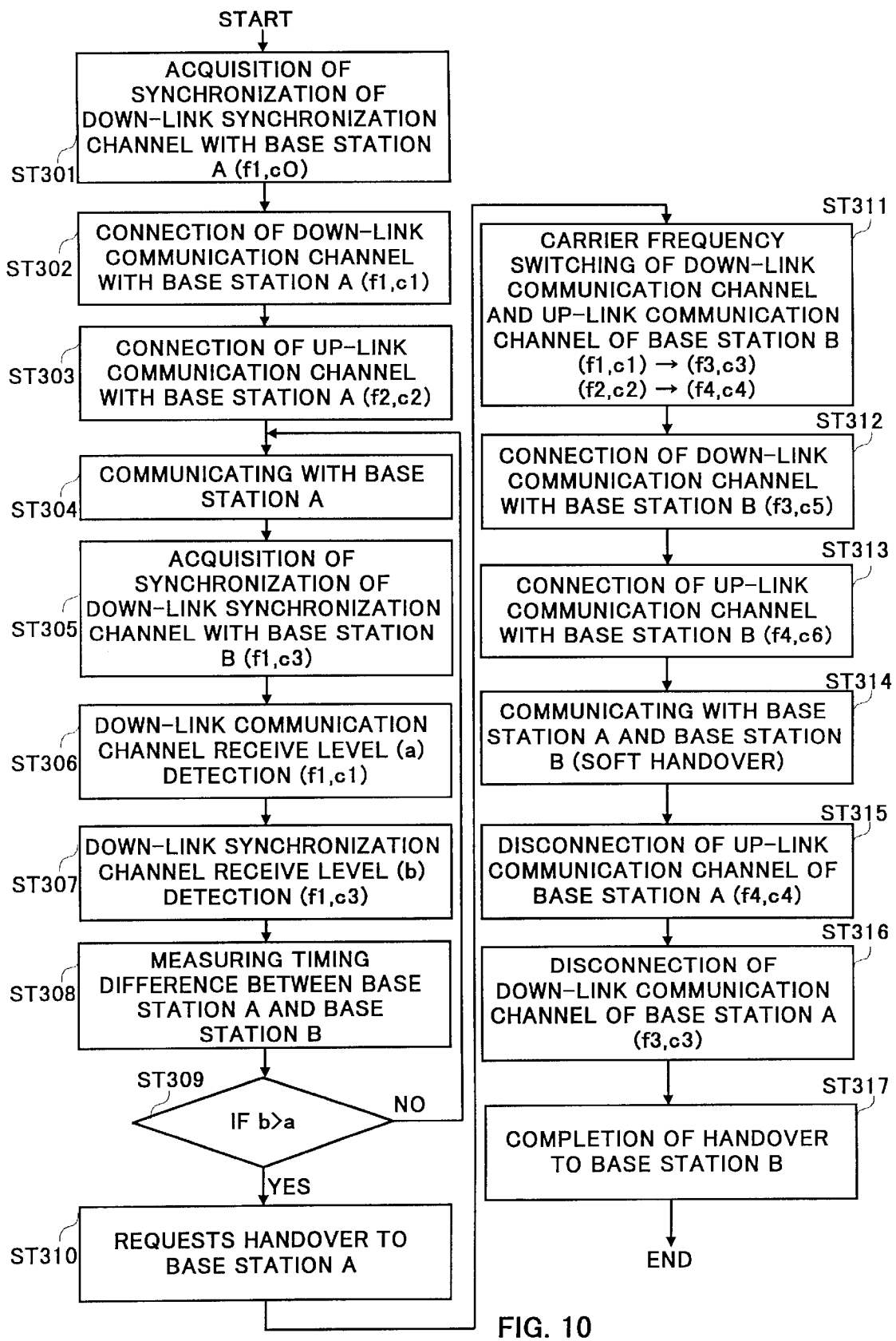
FIG. 10 is a flowchart of the mobile station in Embodiment 1 of the spread spectrum communication system of the present invention.

The configuration of a spread spectrum communication system (portable telephone system) in the Embodiment 3 is the same as that of Embodiment 1, and therefore its explanation is omitted here. FIG. 9 is a processing sequence diagram of the spread spectrum communication system (portable telephone system) based on the CDMA-FDD system in Embodiment 3 of the present invention in the case of handover. FIG. 10 is a flowchart of the operation of a mobile station in said spread spectrum communication system. Symbols such as f1 and c0 in FIG. 9 indicate carrier frequency number 1 and spreading code number 0, etc. Since the intention here is to facilitate expansions of base stations, the spreading code timing and frame timing are asynchronous between base stations. Furthermore, continues transmit/receive operations are carried out by taking prevention of interference with hearing aids into account.

The mobile station communicates with base station A using carrier frequency number 1 for the down-link and carrier frequency number 2 for the up-link first. Then, the mobile station carries out handover to base station B and then enters into communication using carrier frequency number 3 for the down-link and carrier frequency number 4 for the up-link.

The mobile station acquires synchronization of a spreading code and frame for down-link synchronization channel (f1, c0) of base station A first (ST 301). The mobile station then connects down-link communication channel (f1, c1) and up-link communication channel (f2, c2) in that order with base station A to enter into communication with base station A (ST 302, 303). While communicating with base station A (ST 304), the mobile station acquires synchronization of a spreading code and frame for down-link synchronization channel (f1, c3) of base station B at the same time (ST 305). Here, the down-link synchronization channel has been transmitted with all carrier frequency numbers, and therefore the mobile station needs only to acquire synchronization for the down-link synchronization channel with the same carrier frequency number as that of the communication channel currently in communication. It need not receive channels with two carrier frequencies simultaneously.

After the mobile station acquires synchronization with base station B, it measures the receive level of both base station A and base station B (ST 306, 307) and at the same time measures the timing difference between base station A and base station B (ST 308). If receive level b of base station B is greater than receive level a of base station A currently in communication (ST 309), the mobile station issues a handover request to base station A and at this time it also reports the information of said timing difference to base station A (ST 310). If receive level b of base station B is smaller than receive level a of base station A, the mobile station continues communication with base station A.

Base station A reports the handover request and timing difference information received from the mobile station to base station B via the base station control system. Base station B starts preparations for receiving the mobile station.

Then, at the time of connection with base station A, the up-link and down-link carrier frequencies are simultaneously switched to number 3 and number 4, respectively (ST 311). At this time, since the spreading code timing and frame timing are unchanged, the carrier frequencies can be changed at the mobile station and base station simultaneously. The time in which the communication channel is instantaneously disconnected due to a change of the carrier frequency number is determined by the performance of the frequency synthesizer and can be suppressed to within several microseconds. At this time, the spreading code number is also changed if necessary.

After switchover of the up-link and down-link carrier frequencies at the time of connection with base station A is completed, a down-link communication channel is transmitted from base station B to the mobile station. The up-link and down-link carrier frequency numbers used are number 3 and number 4 respectively. However, the spreading code number of the down-link communication channel should be a number different from that sent from base station A. While maintaining the connection with base station A, the mobile station connects the down-link and the up-link of channels for communication with base station B (ST 312, 313).

At this time, base station B uses said timing difference information to adjust the timing of receiving the down-link communication channel from base station B at the mobile station to match the timing for receiving the down-link communication channel from base station A at the mobile station. At this time, a timing error remains because of a difference between the distance between the mobile station and base station A and the distance between the mobile station and base station B. Therefore, the mobile station needs to search the receive timing within the range of said timing error to acquire correct receive timing of the down-link communication channel from base station B.

Base station B uses said timing difference information to acquire the receive timing of the up-link communication channel transmitted from the mobile station. Since a timing error also remains at this time because of a difference between the distance between the mobile station and base station A and the distance between the mobile station and base station B, base station B needs to search the up-link receive timing within the range of said timing error to acquire the correct receive timing of the up-link communication channel from the mobile station.

The down-link communication channel transmitted from base station B to the mobile station has the same carrier frequency number as that of the down-link communication channel transmitted from base station A to the mobile station with the only difference of the spreading code number. Therefore, the mobile station need not receive two carriers simultaneously even when the mobile station connects communication channels to both base station A and base station B simultaneously. Furthermore, the up-link communication channel has the same carrier frequency numbers, spreading code numbers, spreading code timings, frame timings, and transmit information for base station A and base station B.

After a communication channel for base station B is established (ST 314), the connection with base station A is disconnected (ST 315, ST 316). That completes handover to base station B (ST 317).

As described above, in the spread spectrum communication system in Embodiment 3, the mobile station can carry out handover between base stations with different carrier frequencies in a short instantaneous disconnection period without the mobile station having the function of transmitting/receiving two carrier frequencies simultaneously.

As described above, in the spread spectrum communication system based on the CDMA-FDD system in which a plurality of carrier frequencies can be selectively used, the present invention eliminates the necessity of the mobile station transmitting/receiving two or more carrier frequencies simultaneously and makes it possible to flexibly use a plurality of carrier frequencies.

Furthermore, the present invention needs only to secure free communication lines to receive mobile stations that move into cells by carrying out handover between base stations for several carrier frequencies, achieving high line utilization at base stations.

The above explanation covers the case where the CDMA/FDD system is used. However, the present invention is also applicable to the case where the CDMA/TDD system is used.

The signals transmitted/received in the system of present invention contain pilot symbol per user in up-link and down-link.

What is claimed is:

1. A base station apparatus executing a handover method of performing handover between base stations with different carrier frequencies in a CDMA system, said apparatus comprising:
   a receiving circuit that receive handover request information from a mobile station currently in communication; and
   a switching circuit that switches a first carrier frequency in which said base station is currently communicating with said mobile station to a second carrier frequency used by a second base station to which handover is performed.

2. A handover method of performing handover between base stations with different carrier frequencies in a CDMA system, comprising:
   switching, in a first base station currently communicating with a mobile station, a first carrier frequency used by the first base station to a second carrier frequency used by a second base station to which the handover is performed; and
   performing, in the mobile station, the handover from the first base station to the second base station using the second carrier frequency;
   wherein the mobile station performs communications with the first base station and the second base station using the second carrier frequency and respective different spreading codes.

3. A handover method in a CDMA system for performing a handover of a mobile station between base stations using different carrier frequencies, the method comprising:
   measuring, in the mobile station, a frame timing difference between a first frame timing of a first base station, which is currently communicating with the mobile station, and a second frame time of a second base station, which is to receive the handover of the mobile station;
   switching, in the first base station, from a first carrier frequency used in the first base station to a second carrier frequency used in the second base station, at the first frame timing; and
   performing, in the mobile station, the handover from the first base station to the second base station at the second carrier frequency with an adjusted frame timing corresponding to the second base station, based on the frame timing difference.

4. A mobile station apparatus that performs a handover in a CDMA system, the handover being carried out between base stations that use different carrier frequencies, the apparatus comprising:
   a measuring system that measures a frame timing difference between a first frame timing of a first base station, currently communicating with the mobile station apparatus at a first carrier frequency, and a second frame timing of a second base station, which is to receive the handover of the mobile station apparatus;
   a switcher that switches from the first carrier frequency of the first base station to a second carrier frequency of the second base station at the first frame timing; and
   a handover performing system that performs the handover from the first base station to the second base station at the second carrier frequency at an adjusted frame timing based on the timing difference.

5. A base station apparatus that performs a handover to a second base station in a CDMA system, the apparatus comprising:
   a receiver that receives a frame timing difference measured in a mobile station currently communicating with the base station apparatus, the frame timing difference comprising a difference between a first frame timing of the base station apparatus and a second frame timing of the second base station that is to receive the handover of the mobile station; and
   a switcher that switches from a first carrier frequency used in the base station apparatus to a second carrier frequency used in the second base station.

6. A handover method in a CDMA system for performing a handover of a mobile station between base stations that use different carrier frequencies, the method comprising:
   measuring, in the mobile station, a frame timing difference between a first base station, currently communicating with the mobile station, and a second base station, to which the handover is carried out;
   switching, in the second base station, from a first frame timing of the first base station to a second frame timing of the second base station, using the frame timing difference;
   performing, in the mobile station, the handover from the first base station to the second base station, using a first carrier frequency; and
   switching, in the mobile station, from the first carrier frequency used in the first base station to a second carrier frequency used in the second base station.

7. A mobile station apparatus that performs a handover in a CDMA system where the handover is carried out between base stations, the apparatus comprising:
   a measuring system that measures a frame timing difference between a first base station, currently communicating with the mobile station apparatus, and a second base station, to which the handover of the mobile station is carried out;
   a transmitting system that transmits the frame timing difference to the second base station;
   a handover performing system that performs the handover from the first base station to the second base station, after the second base station adjusts a reception frame timing using the frame timing difference; and
   a switching system that switches from a first carrier frequency, used in the first base station to a second carrier frequency, used in the second base station, after the handover is carried out with the adjusted reception frame timing using the first carrier frequency.

8. A base station apparatus that performs a handover in a CDMA system where a handover is carried out between base stations that use different carrier frequencies, the apparatus comprising:
   a receiver that receives a frame timing difference measured in a mobile station between a frame timing of the base station apparatus and another frame timing of a first base station from which the handover of the mobile station is carried out;
   an adjuster that adjusts a reception frame timing in the base station apparatus using the frame timing difference; and
   a switcher that switches from a first carrier frequency used in the first base station to a second carrier frequency used in the base station apparatus after the handover is carried out with the reception frame timing adjusted, using the first carrier frequency.

9. A handover method in a CDMA system for performing a handover of a mobile station between base stations using different carrier frequencies, the method comprising:

measuring, in the mobile station, a frame timing difference between a first base station, currently communicating with the mobile station, and a second base station, which is to receive the handover of the mobile station;

switching, in the first base station, from a first carrier frequency used in the first base station to a third carrier frequency dedicated to the handover, with the frame timing of the first base station;

performing, in the mobile station, the handover from the first base station to the second base station at the third carrier frequency, with frame timing adjusted for the frame timing difference; and switching, in the second base station, from the third carrier frequency to a second carrier frequency used in the second base station.

10. A mobile station apparatus that performs a handover between base stations using different carrier frequencies in a CDMA system, the apparatus comprising:

a measuring system that measures a frame timing difference between a first base station, currently communicating with the mobile station apparatus, and a second base station, which is to receive the handover of the mobile station;

a handover performing system that performs the handover from the first base station to the second base station at a third carrier frequency dedicated to the handover switched in the first base station; and a communication system that communicates with the second base station with a frame timing of the second base station, adjusted for the frame timing difference.

11. A base station apparatus that performs a handover between base stations using different carrier frequencies in a CDMA system, the apparatus comprising:

a receiver that receives a frame timing difference measured in a mobile station between a frame timing of the base station apparatus and another frame timing of a first base station from which the handover of the mobile station is performed;

an adjuster that adjusts a reception timing in the base station apparatus using the frame timing difference; and a switch that switches from a third carrier frequency, dedicated to the handover, to a second carrier frequency used in the base station apparatus after the handover is performed based on the adjusted reception frame timing.

* * * * *

UNITED STATES PATENT AND TRADEMARK OFFICE
CERTIFICATE OF CORRECTION

PATENT NO.    : 6,628,630 B1
DATED         : September 30, 2003
INVENTOR(S)   : T. Nagase It is certified that error appears in the above-identified patent and that said Letters Patent is hereby corrected as shown below:

<u>Title page,</u>
Item [56], References Cited, OTHER PUBLICATIONS, please insert the following:

-- An English Language Abstract of JP6-217371 --

Signed and Sealed this

Twenty-second Day of June, 2004

JON W. DUDAS
*Acting Director of the United States Patent and Trademark Office*